United States Patent [19]

Matsumoto

[11] 4,187,401
[45] Feb. 5, 1980

[54] METHOD OF CONTROLLING CHANNEL ASSIGNMENT IN A TIME DIVISION MULTIPLEXING NETWORK

[75] Inventor: Jun Matsumoto, Chiryu, Japan

[73] Assignee: Aiphone Co., Ltd., Nagoya, Japan

[21] Appl. No.: 909,669

[22] Filed: May 25, 1978

[30] Foreign Application Priority Data

Jun. 6, 1977 [JP] Japan .................................. 52-66547

[51] Int. Cl.² .............................................. H04J 3/00
[52] U.S. Cl. ............................ 179/15 BW; 179/15 A
[58] Field of Search .......... 179/15 A, 15 AT, 15 AQ, 179/15 BA, 18 FC, 15 BW, 15 BV

[56] References Cited

U.S. PATENT DOCUMENTS

| 3,641,272 | 2/1972 | Pinet et al. ...................... 179/15 AT |
| 3,963,870 | 6/1976 | Conder et al. ................... 179/15 AT |

Primary Examiner—Bernard Konick
Assistant Examiner—Joseph A. Popek
Attorney, Agent, or Firm—Kenway & Jenney

[57] ABSTRACT

In a time division multiplex network the channel assignment is controlled by assigning each channel, in a channel-by-channel sequence, to each subscriber pair that are communicating or wish to communicate. The subscriber address-data of the addressee or the addressor of each so-assigned channel is stored in a circulating read/write memory with a reset word stored in a memory location following the last memory location containing subscriber address-data. The memory locations are addressed in a successive manner in response to an incrementing clock count and the subscriber address-data, as they are read out from the successively addressed memory locations, are used to provide gating pulses to the respective subscriber modulator/demodulators, and the reset word, when it is read out, resets the memory to repeat the memory read-out cycle. The number of occupied memory locations varies in accordance with the traffic demands to provide a high efficiency service per unit time and high modulation/demodulation qualities during periods of low traffic.

1 Claim, 5 Drawing Figures

METHOD OF CONTROLLING CHANNEL ASSIGNMENT IN A TIME DIVISION MULTIPLEXING NETWORK

CROSS REFERENCE TO RELATED APPLICATION

The present invention is related to that disclosed in co-pending patent application Ser. No. 909,689 filed on even date herewith by the present inventor and assigned to the assignee of the present invention.

BACKGROUND OF THE INVENTION

The present invention relates to a method of controlling channel assignment in a time division multiplexing network.

In known time division multiplexing networks such as a time division exchanger, a plurality of channels or time slots are previously established, and pulse trains are arranged having phase relationships that correspond to the channels, so that a large number of subscribers' lines may easily be connected to each other through a small number of time division channels. All the addresses of the addressors and the addressees are stored in a circulating memory for designating or assigning the channels to the addressors and addressees respectively.

Also, in establishing the channels, the encoding speed (sampling frequency) is specified to obtain a fixed demodulation quality (speech quality). That is, as shown in FIG. 1, n sampling pulse trains are arranged for n channels established, and a sampling pulse corresponding to a designated channel is supplied to a PAM modulation/demodulation circuit of each addressor and addressee, whereby PAM modulation/demodulation is performed respectively.

In a conventional control method, as above, a fixed quality of demodulation and good service having stabilized speech quality are provided, but on the contrary, the following defects are indicated:

(i) there is no countermeasure against traffic demands beyond the established number of channels;

(ii) the encoding efficiency per a time unit is low in the case where traffic demands are under the established number of channels; and (iii) because a phase sampling pulse train corresponding to the established channels is provided separately, the whole structure of the control method becomes complex in addition to the inefficiency of the encoding speed.

SUMMARY OF THE INVENTION

The present invention is intended to eliminate the above mentioned shortcomings of the prior art.

Therefore, the principal object of this invention is to contend with ever-changing traffic demands in a flexible manner and realize 100% encoding efficiency per time unit without specially limiting the number of channels or without establishing a separate pulse train, and is to contend with increased traffic demands by decreasing the encoding speed, or, conversely, to provide a high quality service when traffic demands decrease, thereby providing a time division multiplexing network method which is capable of obtaining a high efficiency service with zero percent loss probability for calling.

In order to achieve the above object of the invention, a PAM sampling pulse train corresponding to the number of established channels or time slots is supplied to each PAM modulation/demodulation circuit of plurality of subscribers; an analog signal transmitted by a subscriber is modulated to a time division PAM pulse, and the pulse is demodulated at the PAM modulation/demodulation circuit of a recipient, in such a manner that the number of channels corresponds to that the number of subscribers who at present desire to make and/or are making transmission and reception of a message.

Other objects and advantages of the invention will be apparent from the detailed description hereinbelow considered together with the following drawings.

DETAILED DESCRIPTION OF THE PREFERRED EMBODIMENT

Hereinafter the control method of the present invention which is applied to a time division multiplexing exchange system will be described with reference to the accompanying drawings.

Figure 1:
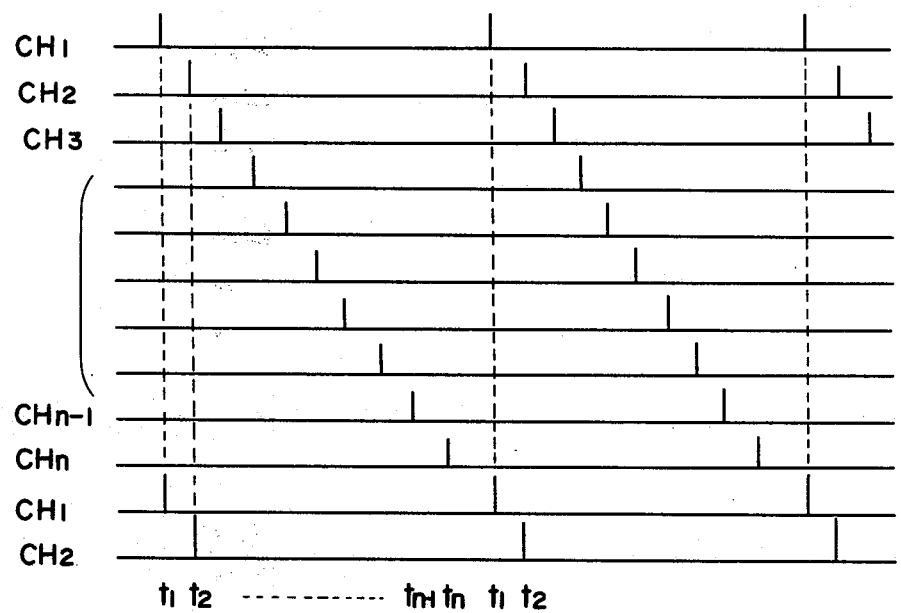
FIG. 1 is a graph illustrating an example of PAM sampling pulse trains used for a time division multiplexing network of the prior art.
Figure 2:
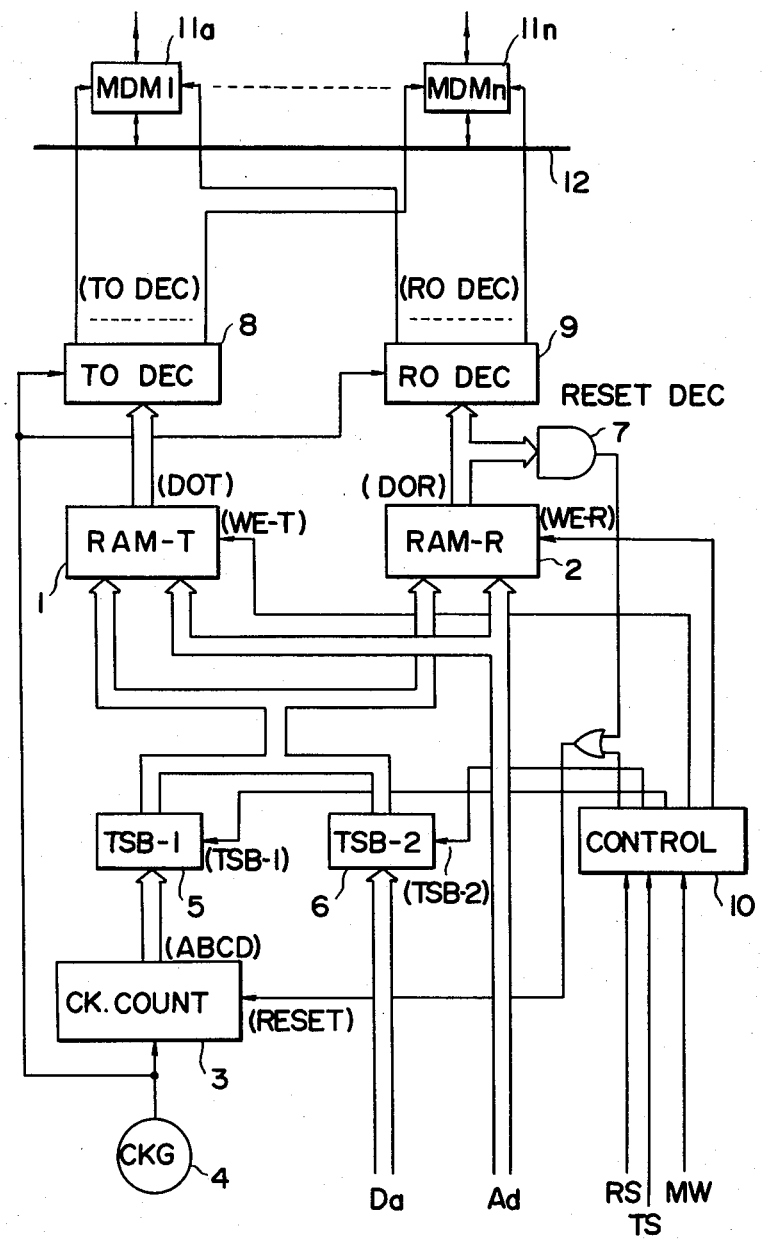
FIG. 2 is a block diagram illustrating an embodiment of the control method of time division multiplexing network according to the present invention.

In FIG. 2, memory circuits RAM-T 1 and RAM-R 2 are composed of IC (integrated circuits) memories and capable of read-out write-in operations respectively. RAM-T 1 stores address data on the transmission side and RAM-R 2 stores address data on the reception side. A clock counter CK.COUNT 3 is a register which counts clock pulses and, at each clock count, selects an address to be read out from RAM-T 1 and RAM-R 2 through BCD codes.

If the data read out of RAM-T 1 or from RAM-R 2 in a case shown in the figure, is reset data, CK.COUNT 3 is reset and repeats counting. A clock CKG 4 supplies clock pulses to CK.COUNT 3 and also provides decode-controls for the output decoders (described later) of RAM-T 1 and RAM-R 2.

Tri-state buffers TSB-1 5 and TSB-2 6 which do not interfere with each other, function, when address data is written in RAM-T 1 and RAM-R 2, to replace a write-in address (Da) with a read-out address performed by CK.COUNT 3. A reset circuit RESET DEC 7 functions to detect output data from RAM-T 1 or from RAM-R 2, in a case such as shown in the figure, and if the detected data is reset data, RESET DEC 7 resets CK.COUNT 3.

Decoders TO DEC 8 and RO DEC 9 decode the output data from RAM-T 1 and RAM-R 2 respectively, and supply sampling synchronous pulses for transmitting and receiving to a PAM/time division multiplexing network.

A controller CONTROL 10 controls RAM-T 1, RAM-R 2, TSB-1 5 and TSB-2 6 whenever receives a signal requesting write-in or rewrite in RAM-T 1 and RAM-R 2 from an outside source, that is, according to a signal from TS to select RAM-T 1 or a signal RS to select RAM-R 2 and a signal MW to select write-in, and simultaneously functions to reset CK.COUNT 3. In other words, CONTROL 10 opens TSB-1 5, closes TSB-2 6 and places both RAM-T 1 and RAM-R 2 in a read-out mode, as long as no signal is applied to RS or TS. When a signal is applied to RS or TS, however, the controller CONTROL 10 closes TSB-1 5 and opens TSB-2 6, further when a write-in signal is applied to MW, CONTROL 10 places RAM-R 2 in a write-in mode when the signal is supplied to RS, and places RAM-T 1 in a write-in mode when the signal is supplied to TS, to write an address data provided by Ad to the address selected by Da at the time. During the time TS or RS receives a signal, CK.COUNT 3 is reset.

PAM modulation/demodulation parts, MDM1 11a to MDMn 11n, transfer, respectively, a PAM pulse signal to a time division multiplexing path (12) by means of the outputs of TO DEC 8 and RO DEC 9.

The following is a description how to transmit a signal
from MDM1 (Address A) to MDM2 (Address B),
from MDM2 (Address B) to MDM1 (Address A),
from MDM3 (Address C) to MDM4 (Address D),
from MDM4 (Address D) to MDM3 (Address C), and
from MDM5 (Address E) to MDM6 (Address F)
respectively in the foregoing device.

In this case, A is written in Address O of RAM-T 1 and B is written in Address O of RAM-R 2; next, B is written in Address 1 of RAM-T 1 and A is written in Address 1 of RAM-R 2; and C, D, E and F are also written in Addresses 2, 3 and 4 of RAM-T 1 and RAM-R 2 respectively, as shown in the following list. Namely, in each address of RAM-T 1 and RAM-R2, the corresponding address of each subscriber is written. And lastly, a reset data (for example, 1111 in case of four bits) is written in Address 5 of RAM-R 2.

| address | data RAM-T | RAM-R |
|---|---|---|
| 0 | A | B |
| 1 | B | A |
| 2 | C | D |
| 3 | D | C |
| 4 | E | F |
| 5 | XXXX | 1111 |
| . | | |
| . | | |
| m | XXXX | XXXX |

Figure 3:
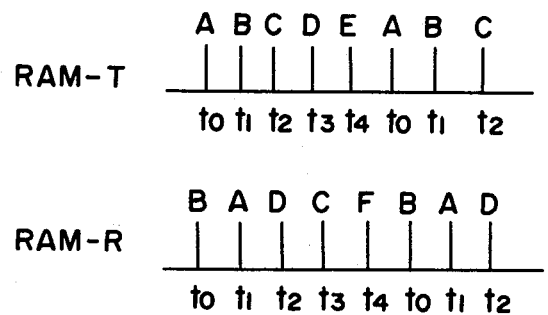
FIGS. 3 and 4 are charts showing addresses of subscribers to which a sampling pulse is supplied.

The above write-in is performed in either RAM-T 1 or RAM-R 2 by selecting TS or RS and supplying the above addresses to DA and the write-in signals to MW. Thus, if TS and RS signals are removed after address data are written or rewritten in RAM-T 1 and RAM-R 2, those address data are read-out one by one by CK.COUNT 3 and the data are decoded by TO DEC 8 and RO DEC 9, which provide sampling synchronous pulses to each PAM modulation/demodulation part corresponding to the respective address data within MDM1 to MDMn as shown in FIG. 3.

That is, when a write-in operation is completed and no signal is supplied to TS and RS, RAM-T 1 and RAM-R 2 are placed in a read-out mode; TSB-1 5 is opened and TSB-2 6 is closed; CK.COUNT 3 proceeds from its reset state to its count state and begins counting from zero the clock pulses provided by CKG 4.

If the output of CK.COUNT 3 is (0000), A and B which are stored, respectively, in Address 0 of RAM-T 1 and RAM-R 2 are read out; the transmission gate of MDM1 11a is then opened by TO DEC 8 and RC DEC 9 to send out a PAM pulse signal to the time division multiplexing path 12; and, simultaneously, the reception gate of MDM2 is opened for receiving the PAM pulse signal sent out of MDM1. Namely, a sample value has been transmitted from MDM1 to MDM2. When the count of CK.COUNT 3 has advanced and the output shows (0001), B and A stored, respectively, in Address 1 of RAM-T 1 and RAM-R 2 are read out, and, a sample value transmitted from MDM2 to MDM1. And when, finally, the reset data (1111), which is stored in Address 5 of RAM-R 2, is read out after the operations described above, the reset data is detected by RESET DEC 7 and CK.COUNT 3 is reset, CK.COUNT 3 then begins counting from zero again to repeat the above operation.

Figure 4:
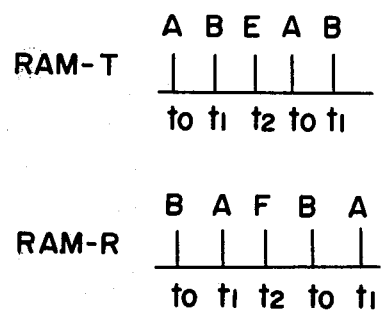

In this way, PAM modulation/demodulation parts, MDM1 to MDMn, are continuously controlled for organizing a network, until the contents of RAM-T 1 and RAM-R 2 are newly written or rewritten. Assuming that the rewritings shown in the following list are provided in each address of RAM-T 1 and RAM-R 2, the encoding speed a sampling synchronous pulse which is supplied to a PAM modulation/demodulation part corresponding to the address data of each address, becomes high as shown in FIG. 4 and a superior quality of demodulation may be obtained.

| Address | data RAM-T | RAM-R |
|---|---|---|
| 0 | A | B |
| 1 | B | A |
| 2 | E | F |
| 3 | XXXX | 1111 |
| . | | |
| . | | |
| m | XXXX | XXXX |

In the above rewriting case, the reset data is written in the location following the last location containing address data.

It should be noted here that the memory size (m) of RAM-T 1 and RAM-R 2 becomes equal to a number of all the channels (one channel for one direction) of the network of this control method. Also, in the above example, the address data are expressed by 4-bit words. In general, however,
Ti $n=2^{n'}$ where the number of PAM modulation/demodulation parts is n. A bit number of n' is necessary according to the above equation. That is, in this case, it is necessary that CK.COUNT 3 is at least a modulo m counter, and the word length in one address of RAM-T 1 and RAM-R 2 is of n' bits.

Also, TSB-1 5 and TSB-2 6 should be made to provide a capacity of m' bits, so that the equation of $m=2^{m'}$ becomes realized.

Furthermore, RESET DEC 7 will have a construction of n' bits, and the capacity of TO DEC 8 and RO DEC 9 should be made to be of n' bits and n outs. Hence, it is necessary that Da and Ad also should be m' bits and n' bits respectively. A clock-pulse frequency fck which is necessary for CKG 4 is expressed as $$fck = 2fs \cdot m$$

where
- m: number of all the channels as mentioned above,
- fs: the maximum frequency in the transmission band, and
- 2: a coefficient according to the sampling theory.

If the channel number to guarantee the demodulation of fs is expressed as mch, the following equation will be realized:

$$fck = 2fs \cdot mch$$

This equation means that according to an increase in the number of channels in use, the sampling frequency supplied to one PAM modulation/demodulation part lowers, and if the number increases more than mch, the demodulation of fs will not be guaranteed any more.

Assume, for example, that number of PAM modulation/demodulation parts is 16, the number of all the channels is 8, the number of the available channels is 4, and the maximum frequency of the transmission band is 8 KHz, the following data may be obtained:

| | |
|---|---|
| CK.COUNT | an octal counter |
| TSB-1, TSB-2 | 3 bits |
| RAM-T, RAM-R | 8 × 4 bits |
| RESET DEC | 4 bits |
| TO DEC, RO DEC | 4 bits to 16 outs |

Also, the necessary fck in this case becomes 64 KHz by the following computation:

$$fck = 2 \times 8(KHz) \times 4 = 64(KHz)$$

Figure 5:
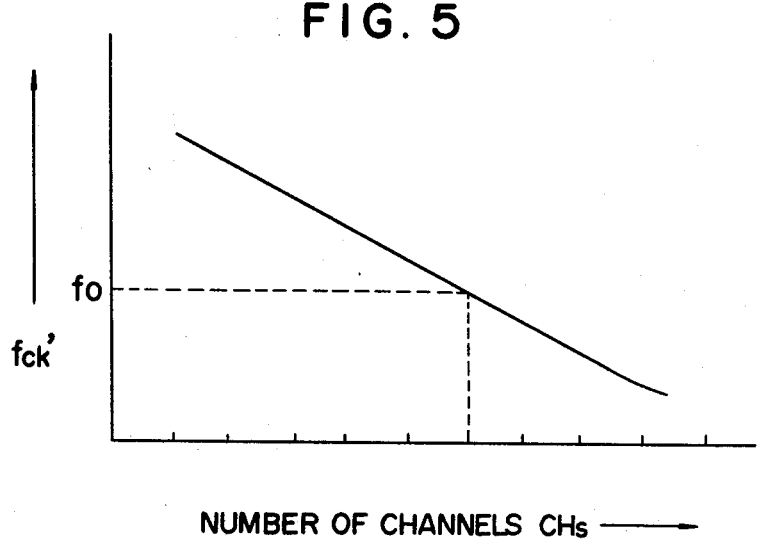
FIG. 5 is a graph showing the correlation between the traffic demands (number of channels) and the demodulation quality.

In consequence, as shown in FIG. 5, if a frequency guaranteeing the standard demodulation quality of encoding frequency f'ck per one modulation/demodulation circuit is put into fo and the number of channels corresponding to said frequency fo is put into CHs, a high quality service will be possible by making f'ck high so long as the channel number is less than CHs, and even when the channel number is over CHs, on the contrary, an effective measure may be taken against such case by lowering f'ck.

Control of the foregoing write-in and rewrite operation from the outside, that is, control of Da, Ad, TS, RS and NW, must be completed in a very short time because, during the time consumed by the above control, sampling synchronous pulses supplied to the PAM modulation/demodulation parts ore suspended. Considering this, the control of Da, Ad, TS, RS and NW is more effectively done in the case of the preferred embodiment, by a processor and a computer rather than in a manual fashion.

In this regard, separately conducted experiments involving the transmission of audio signals indicate that the above control function can be executed in 12.5 ms for one rewrite per second and that this time period can be considered as negligible.

According to the control method of this invention, as has become apparent from the above description, a high efficiency service with no time loss and zero percent loss probability for calling may be realized by flexibly contending with an increase or decrease of the quantity of traffic demands in proportion to the demodulation quality of a message. In addition, according to this method, a network may be organized in a simple manner, since no special restriction on the number of channels is required and no specially establishment pulse trains are required.

The foregoing description of the present invention is disclosed in the context of a time division multiplex PAM exchange method. This control method, however, is not limited to the embodiment as described above, but may also be applied to PCM and PWM time division multiplexing systems, graphic displays such as a mosaic display boards, and character displays. It is, of course, understood that modifications may be made in the foregoing embodiment without departing from the scope of the invention as set forth in the appended claims and their legal equivalent.

What is claimed is:

1. In a method for controlling the channel assignment of a time division multiplex network of the type that interconnects a large number of subscribers with one another through a selected smaller number of time division channels and includes a time division multiplex communication path to which the subscribers are each connected via individual modulation/demodulation circuits for modulating an analog signal to a pulse signal when transmitting the analog signal to said communication path and for demodulating the pulse signal to the analog signal when receiving the pulse signal from the communication path, the improvement comprising the steps of:

assigning each time division multiplex channel, in a sequential manner, to a particular subscriber addressor/addressee pair who presently desire to communicate or are communicating with one another along the communication path, the addressor and the addressee of each so-assigned channel each identified by subscriber address-data which corresponds to the respective modulation/demodulation circuit of the addressor or addressee;

storing, in a channel-by-channel sequence, the subscriber address-data of the addressor or the addressee of the so-assigned channels in successive addressable storage locations of a circulating read/write memory;

storing reset data in a storage location of said circulating memory following the last storage location that contains subscriber address-data;

reading-out, in sequence, the subscriber address-data from each storage location in said circulating memory and using the read-out subscriber address-data for gating the particular modulation/demodulation circuit corresponding to the read-out subscriber address-data; and reading-out the reset data and using the reset data to repeat said reading-out of the subscriber address-data step.

* * * * *

UNITED STATES PATENT AND TRADEMARK OFFICE
CERTIFICATE OF CORRECTION

PATENT NO. : 4,187,401
DATED : February 5, 1980
INVENTOR(S) : Jun Matsumoto

It is certified that error appears in the above-identified patent and that said Letters Patent are hereby corrected as shown below:

Col. 2, line 2, before "PAM" insert --multiplex--.
Col. 2, line 34, delete "and".
Col. 2, line 43, delete "a" and insert therefor --the--.
Col. 2, line 63, after "whenever" insert --it--.
Col. 3, line 36, the heading of the left-hand column of the table should read "address data", eliminating the elevated "data".
Col. 4, line 22, after "speed" insert --of--.
Col. 4, line 30, the heading of the left-hand column of the table should read "Address data", eliminating the elevated "data".
Col. 4, line 49, delete "Ti".
Col. 4, line 58, after "bits," insert --respectively--.
Col. 5, line 54, delete "ore" and insert therefor --are--.

Signed and Sealed this

Third Day of June 1980

[SEAL]

Attest:

SIDNEY A. DIAMOND

*Attesting Officer*     *Commissioner of Patents and Trademarks*